Feb. 24, 1959   S. R. PHIN   2,874,619
APPARATUS FOR HEAT SEALING CARTONS
Filed Dec. 15, 1955   3 Sheets-Sheet 1

INVENTOR
SYDNEY R. PHIN
ATTY.

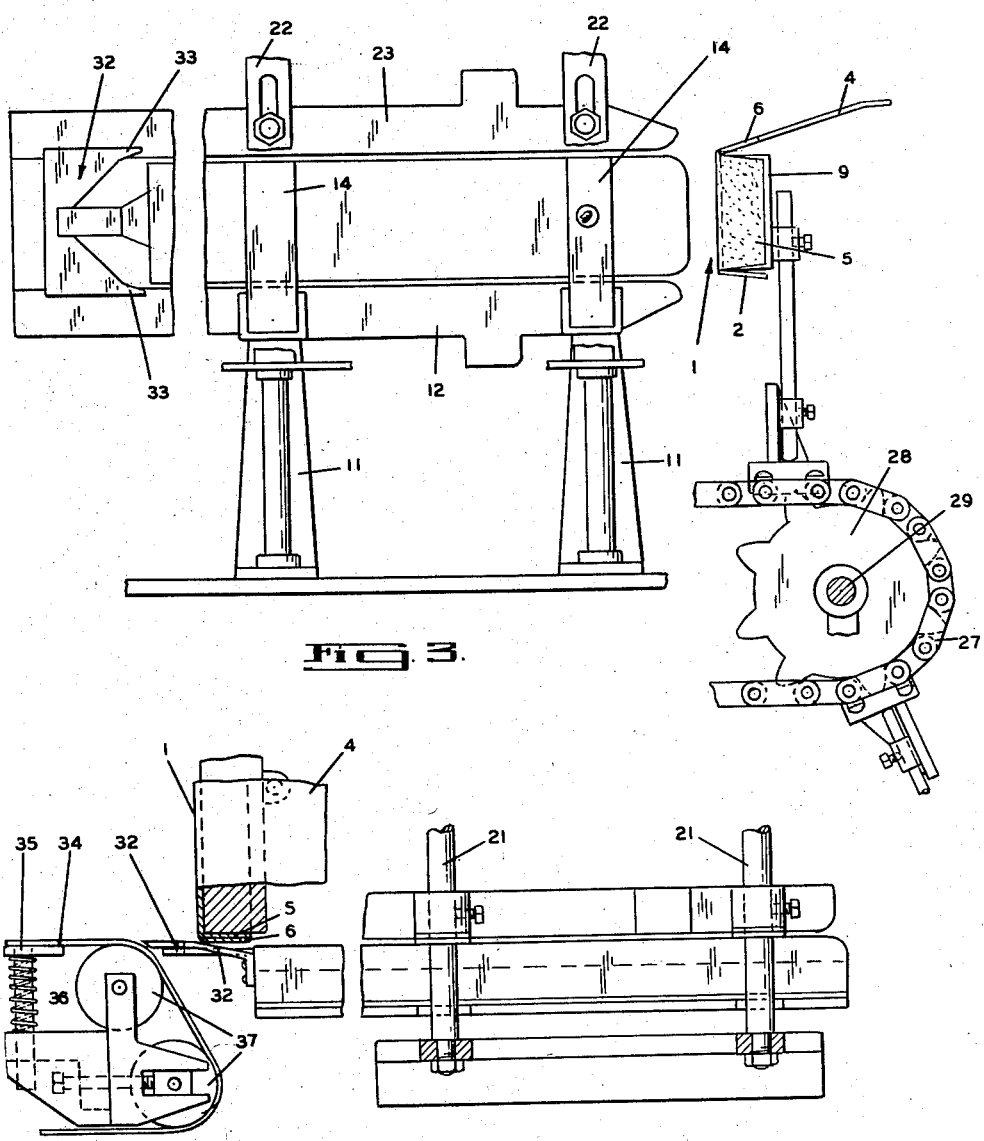

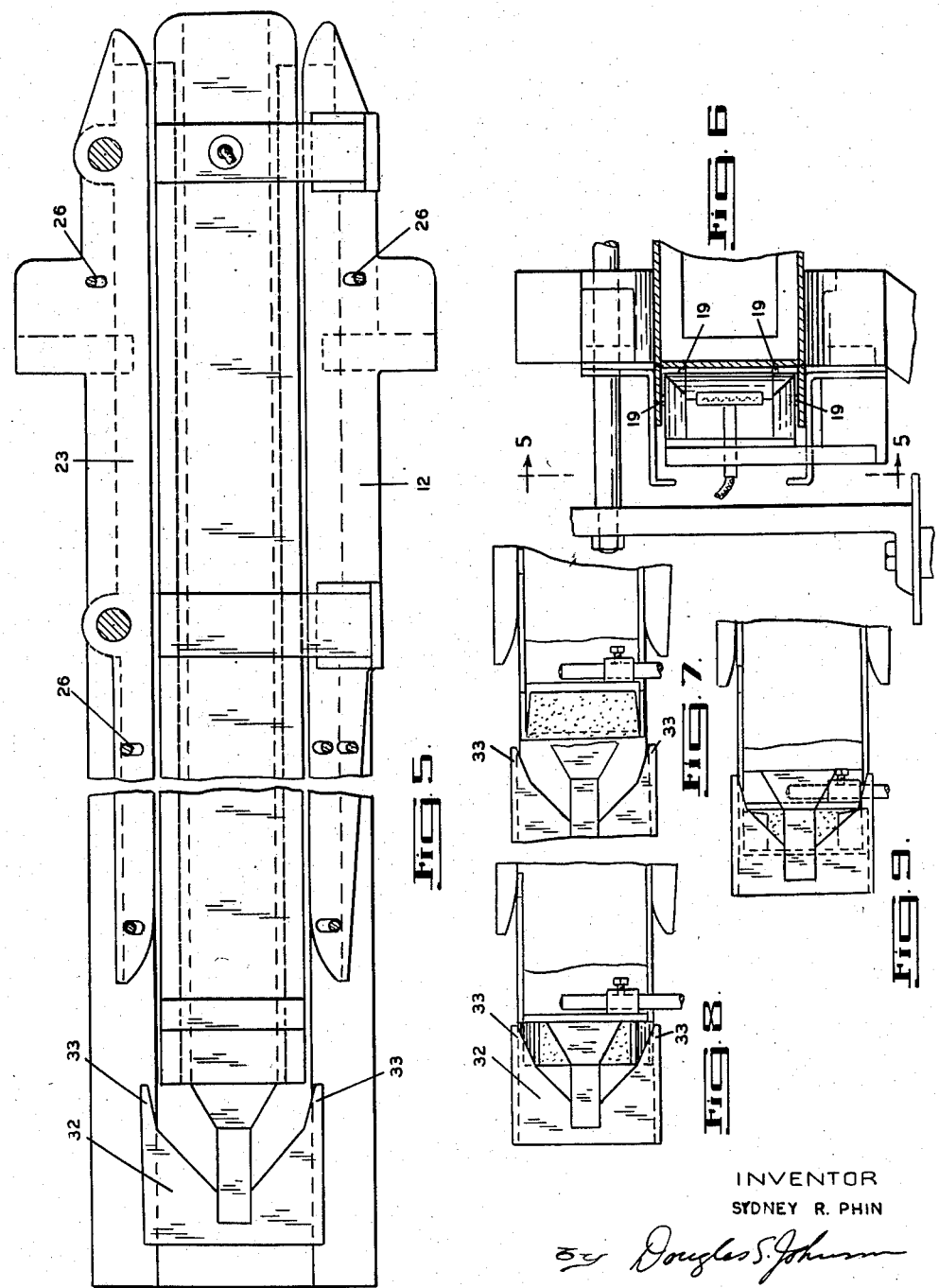

United States Patent Office
2,874,619
Patented Feb. 24, 1959

2,874,619
APPARATUS FOR HEAT SEALING CARTONS
Sydney R. Phin, Toronto, Ontario, Canada
Application December 15, 1955, Serial No. 553,374
2 Claims. (Cl. 93—44)

This invention relates to improvements in methods and apparatus for effecting the seal of heat sealable cartons, boxes and the like.

There are presently large quantities of cartons, boxes and the like formed from blanks which have been coated with a thermoplastic or thermosetting material such as micro crystalline wax, polyethylene and vinyl coatings and like materials to render the finished carton impervious to moisture, rot, fungus, etc.

In the forming of such cartons it has been considered advantageous to make use of the thermosetting properties of the blank coatings by heat sealing the overlapped carton blank flaps, etc., following the folding of the blank. The applied heat causes the folded carton flap coatings to become tacky and melt and on cooling to bond the folded flaps together to complete the carton.

Unfortunately, the bond effected with such present methods does not have the excellency desired because proper heat control is impossible inasmuch as the heat must first penetrate two or more thicknesses of the cardboard or other material of which the blank is made to reach the abutting surfaces of the overlapped blank portions. Moreover, the outward exposed portions of the overlapped blank flaps are also heated and are normally heated to a higher temperature than the contacting surfaces to be bonded resulting in a run off or wipe off of the coating material on such exposed surfaces impairing the moisture proofness of the resulting carton.

In addition, because of the specific heat of the cardboard or other carton material, through which the heat is transmitted to the overlapped surfaces to be bonded, a substantial quantity of heat is stored in the overlapped flaps which heat must be dissipated before the thermoplastic or thermosetting coatings on the abutting surfaces will set and effect the bond. The result is that setting of the bond requires application of pressure to the overlapped surfaces over an appreciable time with the consequent slowing of production.

It is the object of this invention to eliminate the problems presently experienced in heat sealing cartons and the like by enabling heating of the actual contacting surfaces of the folded blank to be accurately controlled to provide a proper bond on cooling.

Another important object is to make use of the material of the folded flaps, tongues, etc. of the blank as heat sinks to absorb heat away from the contacting surfaces of such folded members rather than imparting heat to the surfaces to thereby materially reduce setting time of the bond and both simplify and speed up manufacture.

Still another important object is to eliminate run off or wipe off of the blank coating material during the sealing operation.

More particularly according to the present invention the surfaces of the carton blank which are to be sealed together are directly heated to the requisite temperature before being brought into overlapped relation leaving the material of the blank beneath such surfaces relatively cool to rapidly absorb the surface heat following overlapping and pressing together of the surfaces to effect a quick set of the bond therebetween.

Another important feature resides in radiating the heat onto the surfaces of the flaps, tongues, etc. to be brought into contact on overlap to prevent wipe or run off of the coating, run off being eliminated by the proper control of the heat directly on such surfaces.

Still a further feature resides in radiating the heat directly onto the appropriate surfaces of the flaps, etc. while moving the flaps through a chamber which is substantially closed by the passage of the carton blank therethrough so that the heat is contained for efficient heat application.

These and other objects and features of the invention will become apparent from the following description taken in conjunction with the accompanying drawings, in which:

Figure 3 is a side elevational view partly broken away of the apparatus of Figure 1.

Figure 4 is a fragmentary broken away plan view of the apparatus of Figures 1 and 3, showing the heating unit, flap folding fingers and pressure mechanism at one side of the apparatus, the other side (not shown) being identical.

Figure 5 is a longitudinal vertical sectional view on the line 5—5 of Figure 6 on an enlarged scale.

Figure 6 is a fragmentary part front elevational, part transverse vertical sectional detail illustrating the step of heating the surfaces of the carton blank flaps prior to their being folded into abutting relation.

Figures 7 to 9, inclusive, are fragmentary side elevational views of the end flap folding fingers showing, in sequence, the steps of folding the end flaps following the heating step of Figure 6.

Figure 2:
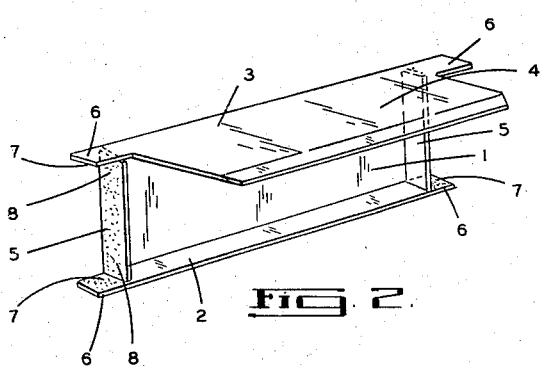
Figure 2 is a perspective view of a carton blank partially folded and ready for heating prior to the final folding step.

Referring first to Figure 2, a typical blank 1 of the type to be formed into a carton is shown as comprising foldable side forming panels 2 and 3, the side panel 3 carrying a top forming panel 4 and foldable end wall forming panels 5. The blank also includes end flaps 6 which are adapted to be folded down onto the end wall forming panels 5 and heat sealed thereto in the completed carton.

Preferably, the entire blank 1 is coated with a suitable thermoplastic or thermosetting material, such as micro crystalline wax, polyethylene, or a suitable vinyl coating, and in the final product, the surface 7 of the end flaps 6 are adapted to be bonded to the surface portions 8 of the end wall forming panels 5 through the application of a heat seal.

In accordance with the invention, the carton blank 1 is first partially folded to the position of Figure 2, with the ultimately abutting surfaces 7 and 8 maintained out of contact. These surfaces 7 and 8 of the end flaps and end wall forming panels 6 and 5, respectively, are then subjected to heat radiated directly onto the surfaces to render the coatings thereon tacky. Following this application of heat the end flaps 6 are turned down to bring the surfaces 7 and 8 into contact as illustrated in the sequence of steps in Figures 7 to 9; then pressure is applied for a predetermined interval to maintain the surfaces 7 and 8 in contact while the coating material thereon, which has previously been rendered tacky, is allowed to cool with the heat dissipating throughout the material of the blank beneath such surfaces until a permanent bond between the surfaces is effected.

Figure 1:
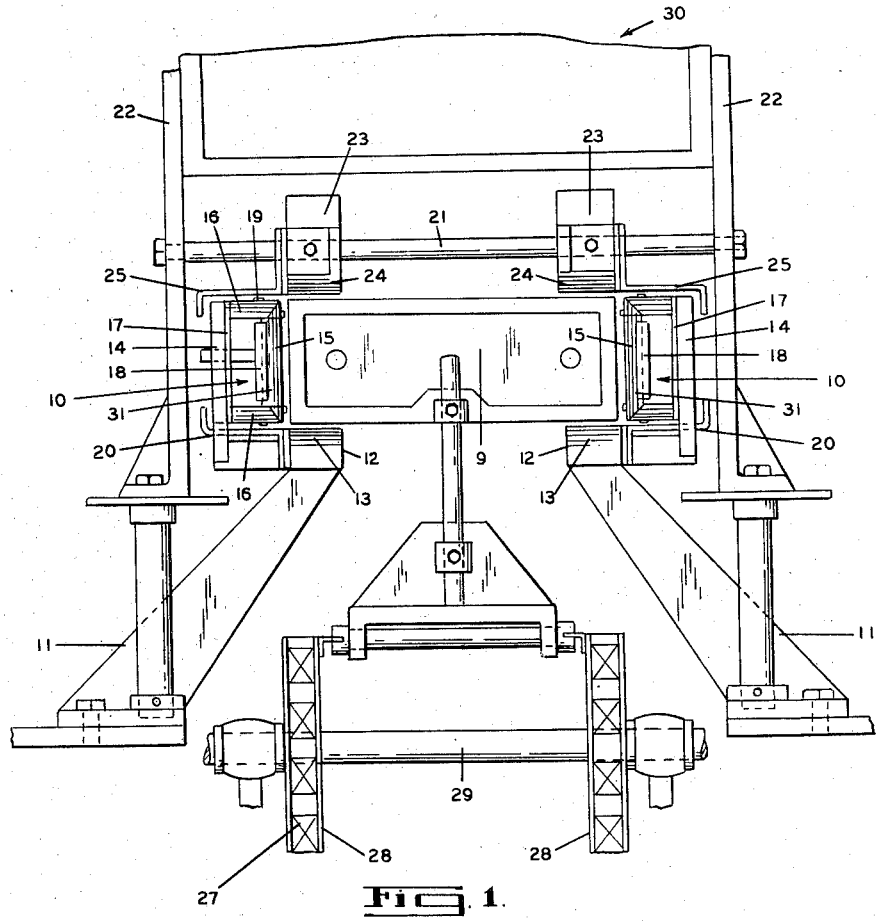
Figure 1 is a front elevational view partly broken away of an apparatus for carrying out heat sealing of a carton blank in accordance with the invention.

Suitable apparatus for carrying out the invention is shown particularly in Figure 1 and 3 as comprising essentially an endless series of driven mandrels 9 about which the blank 1 is adapted to be formed, and a pair of heating units, generally designated at 10, between which the mandrels 9 are fed to expose the surfaces 7 and 8 of the end flaps 6 and end wall forming panels 5 respectively to heat radiated from the heating units as best shown in Figure 6. The apparatus is shown, more or less diagrammatically, as comprising support brackets 11 which carry longitudinal bottom guides 12 formed with rounded forward ends 13 as shown particularly in Figures 3 and 5.

Secured to uprights 14 carried by the bottom guides 12 are the heating units 10 each comprising a front plate 15 and top and bottom plates 16 of suitable heat transfer material, for instance, brass. A backing panel 17 of suitable heat insulating material and a heating element 18 secured to the front plate 15 complete the heating unit. The front plates 15 and top and bottom plates 16 are provided with rails 19, the purpose of which will hereinafter appear.

An L-shaped heat retaining plate 20, spaced below the bottom plate 16 cooperates with the bottom plate 16 to form, in effect, a heating chamber to receive the lower end flap 6 of the partially folded blank of Figure 2.

Mounted for transverse adjustment on suitable cross rods 21, vertically adjustable on uprights 22, are longitudinal upper guides 23 corresponding to the bottom guides 12 and formed with upturned forward edges 24, as best seen in Figures 3 and 5. These upper guides 23 carry heat retaining plates 25 similar to the plates 20 and spaced from the upper or top heater plates 16 to form therewith chambers for the reception of the upper end flaps 6 of the partially folded blank of Figure 2.

Pin and slot arrangements 26 (Figure 5) allow vertical adjustment of the heat retaining plates 20 and 25 to determine the height of the chambers formed there-between and the heater units 10. The mandrels 9 are carried on a suitable endless chain 27 operated by sprockets 28 mounted on a transverse shaft 29 and driven through a suitable drive (not shown).

The magazine of the apparatus is designated diagrammatically at 30 and blanks from this magazine are fed through any suitable conventional blank delivering mechanism (not shown) into the path of advance of the mandrels 9, and as the mandrel 9 advances into the tunnel-like formation formed by the top and bottom guides 23 and 12 respectively, and the heating units 10, the guide members 23 and 12 will fold over the side panels 2 and 3 and conform them to the shape of the mandrel while the front plates 15 of the heating units will fold over the end panels 5, these front plates 15 having rounded leading edges 31 similar to the rounded edges 24 and 13 of the upper and lower guides 23 and 12 respectively.

The end flaps 6, on the other hand, are disposed in the extended position of Figure 2 entering the chambers formed between the top and bottom plates 16 of the heating units and the heat retaining plates 25 and 20. As the mandrel advances longitudinally of the heating units 10, heat from the heat transfer plates 15 and 16 is radiated directly on the inner surfaces 7 of the flaps 6 and the surface portions 8 of the end wall forming panels 5 to raise the coatings thereon to a tacky state.

The rails 19 serve to maintain the flaps 6 and panels 5 out of contact with the top and bottom plates 16 and front plate 15 of the heating units to prevent wipe off of the coatings during feed of the partially folded blank longitudinally of the heating units.

It will be appreciated that the heat of the heating units 10 can be adjusted to raise the temperature of the coatings on the surfaces 7 and 8 to a tacky condition without requiring the body of the material forming the blank to be raised to the same temperature, and in fact, the coatings on the surfaces 7 and 8 act, in effect, as a heat insulating medium so that the material of the blank beneath the surfaces 7 and 8 remains relatively cooler than the coatings thereon. At the same time, the heat retaining plates 25 and 20 retain the heat to eliminate heat wastage and to raise the temperature of the blank material in the chambers defined by these retaining plates through heat reflection to a point where the temperature differential between the blank material and the coatings will not be too large to prevent excessive cooling of the coatings before bond of the surfaces 7 and 8 commences, following turning down of the flaps 6. The actual amount of heat radiated from the heating units 10 will, of course, be controlled by a suitable thermostat (not shown).

As shown in Figures 3 to 9, disposed at the end of each of the heating units 10 is a folding device 32 having offset fingers 33 which are shaped to engage the outer surfaces of the end flaps 6 as the mandrel with the partially folded blank thereon is fed longitudinally of the apparatus, and to subsequently effect folding movement of the end flaps 6, as shown in Figures 8 and 9, to bring the surfaces 7 and 8 into abutment.

At each side of the apparatus is arranged an endless belt 34 disposed with its plane vertical and operating over a plate 35 urged inwardly towards the ends of the mandrel by a suitable spring 36. The belt passes over suitable rollers 37 which may be driven as desired. Thus, the belt 34, shown in Figure 4, and its corresponding member on the opposite side of the apparatus (not shown), act to force the ends of the folded carton blank inwardly against the mandrel 9 as the mandrel is fed longitudinally between these belts.

In this way, pressure is applied between these surfaces 7 and 8 following the heating of the coatings thereon and the folding thereof into abutment during the period of cooling of the surface coatings. The pressure is maintained for a predetermined time, depending on the length of the belts 34 to insure that a proper bond between the surfaces 7 and 8 is obtained prior to pressure release. In this connection it is to be noted that by virtue of the fact that the coatings on the surfaces 7 and 8 have been heated by direct radiation and not by application of heat through the material of the carton, and the material of the carton has been maintained at a lower temperature than the coatings, the carton material forms, in effect, a heat "sink" to absorb heat from the coatings for relatively rapid cooling of the thermoplastic or thermosetting material of the coatings, so that a permanent bond can be obtained quickly and allowing the practical application of pressure during the achieving of such bond in a simple apparatus or machine.

It will be appreciated that the particular apparatus employed in carrying out the invention may vary in detail and arrangement and the apparatus shown herein is intended to be by way of illustration only, and not by way of limitation.

What I claim as my invention is:

1. Carton forming apparatus for forming cartons from blanks coated with a thermoplastic material having foldable side and end forming panels and end flaps to be folded onto said end forming panels in the completed carton to bring certain of said end flap and end panel surface portions into abutment, said apparatus comprising an endless series of mandrels, means for driving said endless mandrel series, means for folding a carton blank around said mandrel to bring said side and end forming panels into carton forming relation while leaving said end flaps extended, a pair of longitudinal heating units disposed at opposite sides of said mandrels and between which said mandrels are adapted to pass, said heating units having multiple heat radiating surfaces adapted to radiate heat directly onto the surface portions of the extended end flaps and the end panels which are adapted to abut on folding of the end flaps of a blank disposed on a mandrel between said heating units, means for folding the end flaps of a blank having its side and end forming panels conformed around a mandrel following heating by said heating units, and means for applying pressure to a folded blank on said mandrels following heating and end flap folding.

2. A device as claimed in claim 1 in which heat reflecting elements are disposed adjacent to said heating units to form heat retaining chambers for the reception of the end flaps of a carton blank on a mandrel passing between said heating units.

References Cited in the file of this patent

UNITED STATES PATENTS

| | | |
|---|---|---|
| 2,169,311 | Widell | Aug. 15, 1939 |
| 2,600,954 | Bardet | June 17, 1952 |